Patented Dec. 13, 1949

2,491,065

UNITED STATES PATENT OFFICE 2,491,065

PROCESS FOR PRODUCING ASCORBIC ACID FROM 2-KETO-LEVO-GULONIC ACID OR ITS DERIVATIVES

Marie van Eekelen and Pancras J. van der Laan, Utrecht, Netherlands, assignors to Nederlandsche Organisatie voor toegepastnatuurwetenschappelijk onderzoek ten behoeve van de Voeding, The Hague, Netherlands No Drawing. Application March 22, 1946, Serial No. 656,504. In the Netherlands December 1, 1941

Section 1, Public Law 690, August 8, 1946
Patent expires December 1, 1961

3 Claims. (Cl. 260—344.5)

This invention relates to a process for producing ascorbic acid from 2-keto-levo-gulonic acid and its derivatives.

For the production of ascorbic acid it is possible to start inter alia from ketogulonic acid, esters of keto gulonic acid or also from methylene-ether derivatives of these substances.

Thus it is known that 2-keto-levo-gulonic acid or its esters can be converted into ascorbic acid by treatment with alkaline substances, followed by a neutralization with acid or elimination of the bases by distillation. The 2-keto-levo-gulonic acid, or derivatives thereof which can easily be split by acids, can also be converted into ascorbic acid by heating them with acid or acid-reacting substances. The esters of bismethylene-ethers of the 2-keto-levo-gulonic acid too can be converted by acid-reacting substances into ascorbic acid. In this case it was recommended not to work considerably above 100° C. (German patent specification 676,011, page 2, lines 1–37), respectively up to about 120° C. (British patent specification 428,815, page 1, lines 17–21).

Further it is known that 2-keto-levo-gulonic acid itself can be converted into ascorbic acid by heating it in water saturated with carbon dioxide. In this manner, 12–14% of the keto-gulonic acid are converted within 2 hours into ascorbic acid. In these experiments the acid was not heated above 100° C. and even this temperature was considered to be disadvantageous, in that the low yield was attributed to the slight stability of ascorbic acid. In connection with this idea it was therefore recommended in the relative publication of T. Reichstein and A. Grüsner (Helvetica Chimica Acta (1934) pages 315, 325) to interrupt the heating after not too much time, to separate the ascorbic acid formed and to convert again the recovered keto gulonic acid in the same way.

During the heating in pure water below or at the boiling point no conversion of keto-gulonic acid and its derivatives could be observed, see U. S. P. specification 2,165,151, page 1, lines 35–40, left hand column.

We have now found unexpectedly, that a very satisfactory conversion of ketogulonic acid or its esters, or also of the bismethylene-ethers of keto gulonic acid or esters of these compounds can be obtained, by operating at a temperature of at least about 130° C., preferably 140° C. or higher.

It appears to be unnecessary to saturate the water previously with carbon dioxide, seeing that the reaction proceeds just as well when working with boiled water. We have found however, that it is advantageous to exclude the air completely or substantially completely.

The method of working according to our invention, has naturally very special advantages.

The system for the conversion is very simple, while in one operation the total conversion of the compounds concerned can be accomplished. Further it is unnecessary to add acid, the choice of material for the conversion-system being thus very much simplified. Further the high yield which can amount to 60% and more of the theoretical, is very important. Moreover, it is not necessary to dissolve the starting material in water; the said material can simply be suspended in water and the whole brought in a closed space up to the desired temperature. The reaction is executed with advantage continuously. For instance, it is possible to cause an aqueous solution or suspension of 2-keto-levo-gulonic acid or one of the other above-mentioned starting-materials in a column—which can if desired be preheated—to flow downwardly and to blow in superheated steam at the bottom. By a suitable choice of the temperatures, the concentration of the solution of ascorbic acid flowing from the tower can be regulated. It is also possible to work according to a cascade system. The following examples illustrate our invention but it is understood that our invention is not limited to these examples.

Example I 100 g. of keto gulonic acid were dissolved into 1 liter of boiled water. After heating in an autoclave during 30 minutes at 140° C. a yield of 50% of ascorbic acid was obtained. After heating during 60 minutes at 140° C. in 2 liters of boiled water a yield of 44% of ascorbic acid was obtained.

Example II

A suspension of 100 g. of diacetone ketogulonic acid hydrate in 1 liter of water after heating during 30 minutes at 140° C. gave a yield of ascorbic acid of 53%. When heating during 1 hour in 2 liters of boiled water the yield amounted to more than 60% of the theory. When heating without addition of water, the water of hydration thus being only present, the conversion after 30 minutes amounted to 33%.

Example III 100 g. of ketogulonic acid methyl ester dissolved in 1 liter of water were heated in an autoclave during 30 minutes at 140° C. A yield of ascorbic acid of about 60% was obtained.

What we claim is:

1. Process of producing ascorbic acid which consists of causing a mixture of water and a compound selected from the group consisting of 2-keto-levo-gulonic acid, its di-methylene-ethers and the lower esters of 2-keto-levo-gulonic acid and its dimethylene ethers to flow downwardly in a column and heating it to a temperature of between 130° C. and about 140° C. by blowing in superheated steam at the bottom.

2. Process of producing ascorbic acid which consists of causing a mixture of water and a compound selected from the group consisting of 2-keto-levo-gulonic acid, its dimethylene ethers and the lower esters of 2-keto-levo-gulonic acid and its dimethylene ethers to flow downwardly in a column and heating it to a temperature of about 140° C.

3. Process of producing ascorbic acid which consists of causing a mixture of water and a compound selected from the group consisting of 2-keto-levo-gulonic acid, its dimethylene ethers and the lower esters of 2-keto-levo-gulonic acid and its dimethylene ethers to flow downwardly in a column and heating it to a temperature of between 130° C. and about 140° C.

MARIE van EEKELEN.
PANCRAS J. van der LAAN.

REFERENCES CITED

The following references are of record in the file of this patent:

UNITED STATES PATENTS

| Number | Name | Date |
| --- | --- | --- |
| 2,265,121 | Reichstein | Dec. 2, 1941 |

FOREIGN PATENTS

| Number | Country | Date |
| --- | --- | --- |
| 428,815 | Great Britain | May 20, 1935 |